(12) United States Patent
Zhan et al.

(10) Patent No.: US 12,257,651 B2
(45) Date of Patent: Mar. 25, 2025

(54) WELDING METHOD FOR HIGH-STRENGTH WELDING WIRE BASED ON NANOPARTICLE IMPLANTATION AND TRACE ELEMENT COMPENSATION

(71) Applicant: NANJING UNIVERSITY OF AERONAUTICS AND ASTRONAUTICS, Nanjing (CN)

(72) Inventors: Xiaohong Zhan, Nanjing (CN); Jianfeng Wang, Nanjing (CN); Yue Li, Nanjing (CN); Yanqiu Zhao, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/812,756

(22) Filed: Aug. 22, 2024

(65) Prior Publication Data
US 2024/0408704 A1 Dec. 12, 2024

(30) Foreign Application Priority Data
Feb. 4, 2024 (CN) .......................... 202410157980.X

(51) Int. Cl.
*B23K 35/00* (2006.01)
*B23K 26/14* (2014.01)
(Continued)

(52) U.S. Cl.
CPC .......... *B23K 35/34* (2013.01); *B23K 26/1464* (2013.01); *B23K 35/302* (2013.01)

(58) Field of Classification Search
CPC ............ B23K 35/0266; B23K 35/0261; B23K 9/173; B23K 26/38; B23K 35/3608;
(Continued)

(56) References Cited

U.S. PATENT DOCUMENTS

| | | | |
|---|---|---|---|
| 5,462,712 A * | 10/1995 | Langan | C22F 1/057 420/533 |
| 11,958,124 B2 * | 4/2024 | Copperthite | B23K 20/233 |

(Continued)

FOREIGN PATENT DOCUMENTS

| CN | 111112875 A | 5/2020 |
|---|---|---|
| CN | 211052975 U | 7/2020 |

(Continued)

OTHER PUBLICATIONS

Wuxiong Yang et al., "Dual-Beam Laser Welding of T-Joint of Aluminum-Lithium Alloy 2060-T8/2099-T83", Chinese Journal of Lasers, vol. 40, No. 7, Jul. 10, 2013, Paragraph 2, right column, p. 0703001-2 to last paragraph, right column, p. 0703001-3.

(Continued)

*Primary Examiner* — Erin B Saad

(57) ABSTRACT

A high-strength welding wire includes, in weight percentage, 5.8% Cu, 0.2% Mn, 0.1% V, 0.2% Zr, 0.2% Si, 0.3% Fe, 0.1% Zn, 1.4% compensation element, 0.2% hydrogen evolution element, 1.2% nanoceramic particle, and Al for the balance. Various powdered raw materials are mixed, wrapped with an aluminum strip, rolled and subjected to wiredrawing to form the high-strength welding wire. In a welding method for the high-strength welding wire, a K-shaped groove is formed between a stringer and a panel, and an inclined angle of the welding gun and a distance between the welding gun and the weld are adjusted. Then the angle between the wire-feeding tube and the welding gun and the striking mechanism and the weld are adjusted. Protective gas is supplied to the welding pool, and a laser is activated to perform welding. A striking mechanism is started to strike the weld.

3 Claims, 9 Drawing Sheets

(51) Int. Cl.
 *B23K 35/30* (2006.01)
 *B23K 35/34* (2006.01)
(58) Field of Classification Search
 CPC ............ B23K 35/0244; B23K 2101/06; B23K 26/32; B23K 9/122; B23K 2101/32; B23K 35/00; B23K 26/0006; B23K 35/0227; B23K 35/004; B23K 35/24; B23K 9/1093; B23K 9/295; B23K 26/21; B23K 26/702
 See application file for complete search history.

(56) References Cited

U.S. PATENT DOCUMENTS

| | | | |
|---|---|---|---|
| 2002/0012810 A1* | 1/2002 | Osame | B23K 26/211 |
| | | | 428/650 |
| 2006/0169388 A1* | 8/2006 | Shimizu | B29C 66/1122 |
| | | | 156/580.2 |
| 2011/0284618 A1* | 11/2011 | Mukai | H01L 24/742 |
| | | | 228/9 |
| 2018/0044769 A1* | 2/2018 | Enloe | C22C 38/22 |
| 2020/0190611 A1* | 6/2020 | Lu | C21D 8/0484 |
| 2021/0187906 A1* | 6/2021 | Lu | B32B 15/012 |

FOREIGN PATENT DOCUMENTS

| | | |
|---|---|---|
| CN | 112548409 A | 3/2021 |
| CN | 214418031 U | 10/2021 |
| CN | 216706263 U | 6/2022 |
| CN | 219170059 U | 6/2023 |
| CN | 116551241 A | 8/2023 |
| CN | 117464238 A | 1/2024 |

OTHER PUBLICATIONS

Zhibin Yang et al., "Study on the Characteristics of Double-Sided Laser Beam Welding for T-Joints", Chinese Journal of Lasers, vol. 40, No. 5, May 10, 2013, pp. 0503007-1 to 0503007-6.

* cited by examiner

WELDING METHOD FOR HIGH-STRENGTH WELDING WIRE BASED ON NANOPARTICLE IMPLANTATION AND TRACE ELEMENT COMPENSATION

CROSS-REFERENCE TO RELATED APPLICATIONS

This application claims the benefit of priority from Chinese Patent Application No. 202410157980.X, filed on Feb. 4, 2024. The content of the aforementioned application, including any intervening amendments thereto, is incorporated herein by reference in its entirety.

TECHNICAL FIELD

This application relates to laser welding, and more particularly to a high-strength welding wire based on nanoparticle implantation and trace element compensation, and a preparation method and a welding method thereof.

BACKGROUND

Aluminum-lithium alloy (Al—Li alloy) has attracted considerable interest in the field of aviation in the past decade. Lithium is the lightest metal element, and the Al—Li alloy is formed by introducing lithium into aluminum. The addition of lithium reduces the specific gravity and increases the stiffness of the alloy, and the alloy still maintains high strength, excellent corrosion and fatigue resistance, and suitable ductility. In view of this, the new alloy has attracted extensive attention from the aviation, aerospace and marine industries.

In addition to the arrangement at an interior of wings, the stringer can also be used in the fuselage to withstand the longitudinal tensile stress in the fuselage. The stringer needs to be perpendicularly fixed to a panel, and thus welded connection is required therebetween. The stringer is generally made of an aluminum-lithium alloy. As a high energy beam welding method, laser welding is characterized by high energy density and outstanding productivity. However, the high energy density of the laser welding will make the low-boiling-point elements in the aluminum-lithium alloy material experience serious loss, thereby affecting the weld quality. Moreover, in the laser welding process, if the surface of the to-be-welded material is not completely cleaned, or the to-be-welded material and welding wire are not completely dried and contain water, hydrogen will be produced and retained in the weld to form pores, seriously affecting the weld quality. The high cooling efficiency of laser welding will lead to a relatively large internal stress in the weld, thereby resulting in the occurrence of cracks in the weld and affecting the weld strength.

SUMMARY

An object of this application is to provide a high-strength welding wire based on nanoparticle implantation and trace element compensation, and a preparation method and a welding method thereof, so as to solve the problems of poor quality and low strength of welds in the welding process of the existing aluminum-lithium alloys. Technical solutions of this application are described as follows.

This application provides a high-strength welding wire based on nanoparticle implantation and trace element compensation, comprising, in weight percentage, 5.5%-6.0% of Cu, 0.1%-0.5% of Mn, 0.05%-0.2% of V, 0.1%-0.5% of Zr, 0.1%-0.5% of Si, 0.1%-0.5% of Fe, 0.1%-0.5% of Zn, 1.0%-2.0% of a compensation element, 0.1%-0.5% of a hydrogen evolution element, 1.0%-2.0% of a nanoceramic particle, and Al for the balance.

In an embodiment, the high-strength welding wire comprises, in weight percentage, 5.8% of Cu, 0.2% of Mn, 0.1% of V, 0.2% of Zr, 0.2% of Si, 0.3% of Fe, 0.1% of Zn, 1.4% of the compensation element, 0.2% of the hydrogen evolution element, 1.2% of the nanoceramic particle, and Al for the balance.

In an embodiment, the compensation element comprises Mg and Li, wherein Mg accounts for 0.2% of a weight of the welding wire, and Li accounts for 1.2% of the weight of the welding wire; the hydrogen evolution element is Nb; and the nanoceramic particle is nano-TiC particle or nano-TiB$_2$ particle, or a combination thereof.

This application further provides a method of preparing a high-strength welding wire based on nanoparticle implantation and trace element compensation, comprising:

(S1) weighing Al powders, Cu powders, Li powders, Mn powders, V powders, Zr powders, Si powders, Fe powders, Mg powders, Nb powders, and Zn powders in accordance with a preset weight ratio, following by ball milling in a ball mill under an inert atmosphere to obtain a first mixed powder;

wherein Al powders, Cu powders, Li powders, Mn powders, V powders, Zr powders, Si powders, Fe powders, Mg powders, Nb powders, and Zn powders are all high-purity metal powders with purity greater than 99.9%;

grinding balls in the ball mill are spherical zirconium oxide (ZrO$_2$); the ratio of the grinding balls to the first mixed powders is 6:1; the ball milling time is 2-3 h; and the rotational speed is 300 rpm; the inert gas is nitrogen or argon; and the inert gas is used to protect the mixed powders in the ball mill, which can avoid the oxidation of the mixed powders.

(S2) weighing the nano-TiC particle or the nano-TiB$_2$ particle; and mixing the first mixed powder with the nano-TiC particle or nano-TiB$_2$ particle in a high-speed mixer to obtain a second mixed powder; wherein a rotational speed of the high-speed mixer is 3000 r/min, and a mixing time is 30 min;

(S3) rolling an aluminum strip with a thickness of 0.5 mm into a U-shaped groove structure; filling the second mixed powder in the U-shaped groove structure followed by rolling under a sealing condition by a roller press to obtain a tubular welding wire blank; and (S4) subjecting the tubular welding wire blank to wire-drawing by using a wire-drawing die to obtain the welding wire with a diameter of 1.2 mm. After drawing the welding wire blank, the welding wire needs to be brightened to improve the smoothness of the surface of the welding wire.

In an embodiment, in the step (S1), a particle size of the first mixed powders is 50-100 μm.

Preferably, in the step (S2), a particle size of the TiC nanoparticles and TiB$_2$ nanoparticles is 80-100 nm.

This application further provides a welding method of the high-strength welding wire based on nanoparticle implantation and trace element compensation, comprising:

(1) forming a K-shaped groove between a stringer and a panel; cleaning surfaces of the stringer and the panel; and fixing the stringer and the panel on a working platform, wherein the stringer and the panel are both made of an aluminum-lithium alloy;

(2) installing a clamping device on a manipulator; fixing a welding gun on a clamping mechanism of the clamping device; and adjusting an inclined angle of the welding gun such that an included angle between the welding gun and the stringer is 20°-80° which is the angle at which the welding gun is deviated from the stringer; and adjusting a distance between a bottom end of the welding gun and a weld to be 40-60 mm;

(3) fixing a wire-feeding tube on a fixing mechanism; adjusting an angle between the wire-feeding tube and the welding gun to 20°-50°; adjusting a laser-arc distance to 2-5 mm; and adjusting a distance between a striking mechanism and the weld;

(4) opening a gas cylinder to supply a protective gas to a welding pool at a flow rate of 10-20 L/min; and starting the manipulator and a laser to weld the stringer with the panel, wherein a laser power is 2-3 KW, a welding speed is 0.5-2 m/min, a laser oscillating frequency is 50-100 Hz, a laser oscillating amplitude is 1-3 mm, and a feeding speed of the welding wire is 1-4 m/min; and the laser welding machine adopts an oscillating laser head;

(5) starting the striking mechanism to strike the weld; and (6) after completing a welding operation, turning off the laser and the striking mechanism; and continuing to supply the protective gas for 0.5-2 min, and closing the gas cylinder.

In an embodiment, the clamping device comprises a mounting frame; a middle part of the mounting frame is fixed on the manipulator; two clamping mechanisms are symmetrically provided at two ends of the mounting frame; two fixing mechanisms are symmetrically provided on a first side of the mounting frame, and two striking mechanisms are symmetrically provided on a second side of the mounting frame; the clamping mechanism comprises a first rotating seat; the first rotating seat is provided with a first mounting hole for mounting the welding gun; the first rotating seat is rotationally provided on a first sliding plate; the first rotating seat is configured to be locked with the first sliding plate through a locking member; the mounting frame is provided with a sliding structure configured to drive the first sliding plate to slide on the mounting frame; the sliding structure comprises a rotating shaft rotationally connected to the mounting frame; the mounting frame is provided with a first motor configured to drive the rotating shaft to rotate; the rotating shaft is provided with a transmission plate; two ends of the transmission plate are each hinged to the first sliding plate through a connecting rod; and the mounting frame is provided with a guide rail to guide sliding of the first sliding plate, and a sliding hole to prevent interference with the welding gun.

In an embodiment, the fixing mechanism comprises a first mounting plate; the first mounting plate is provided on a second sliding plate; the second sliding plate is provided with a first threaded hole, and the first threaded hole is configured to allow a first screw rod to pass through, and fit the first screw rod; the first screw rod is rotationally connected to the mounting frame; the mounting frame is provided with a second motor configured to drive the first screw rod to rotate; a drive wheel on an output shaft of the second motor is connected to a first driven wheel on the first screw rod through a first transmission belt; the first mounting plate is provided with a sliding seat; the sliding seat is slidably connected with the first mounting plate; the sliding seat is provided with a jack screw to lock the sliding seat and the first mounting plate; the sliding seat is rotationally provided with a second rotating seat; the second rotating seat is provided with a first gear ring; the sliding seat is rotationally provided with a first gear engaged with the first gear ring; a gear shaft of the first gear is provided with a rotary knob; supporting frames are respectively provided on both sides of the second rotating seat; a rotating plate is rotationally provided between the supporting frames; each of the supporting frames is connected to the rotating plate through a lock nut; the rotating plate is provided with a second mounting hole for fixing the wire-feeding tube; a clamping plate is provided at the second mounting hole for clamping the wire-feeding tube; a middle part of the clamping plate is provided with a sliding rod; the sliding rod is slidably connected to the rotating plate; the rotating plate is rotationally provided with a second gear corresponding to the sliding rod; the rotating plate is rotationally provided with a second gear ring coaxial with the second mounting hole; and the second gear is engaged with the second gear ring and a gear rack on the sliding rod.

In an embodiment, the striking mechanism comprises a third sliding plate; the third sliding plate is slidably connected with the mounting frame; the third sliding plate is provided with a second threaded hole, and the second threaded hole is configured to allow a second screw rod to pass through, and fit the second screw rod; the second screw rod is rotationally connected with the mounting frame; a second driven wheel is provided at an end of the second screw rod, and is in drive connection with the drive wheel on the output shaft of the second motor through a second transmission belt; the third sliding plate is provided with a second mounting plate; a fixing plate is provided on an end of the second mounting plate; a cam is rotationally provided on the fixing plate; a third motor is provided on the fixing plate to drive the cam to rotate; a striking rod is provided on one side of the fixing plate; a guide block is provided at a bottom of the fixing plate; a tilted groove is provided on the guide block; the striking rod is located in the tilted groove, and slidably connected to the tilted groove; an end plate is provided at a top end of the striking rod; and a spring is provided between the end plate and the guide block to keep the end plate being in contact with a side wall of the cam.

Compared with the prior art, this application has the following technical effect.

1. This application adds Nb element as a hydrogen evolution element in the welding wire. Nb element has the function of gas absorption and hydrogen fixation, and Nb can increase the temperature of the welding pool, increase the fluidity of the welding pool, so that the gas involved in the welding pool can be fully discharged, and effectively inhibit the generation of porosity in the weld.

2. Increase of Mg and Li elements in the welding wire can compensate for burn out of the low-boiling-point Mg and Li element in the welding process, improve the wettability between the welding wire and the welding base material, the weld structure, and the strength of the weld.

3. The nano-TiC particles and nano-$TiB_2$ particles are added in the welding wire. The high-melting-point nano-TiC particles and nano-$TiB_2$ particles can be used as nucleation sites in the cooling process of the welding pool, increase the nucleation sites of the crystallization, refine the weld grain. The nano-TiC particles and nano-$TiB_2$ particles as hard particles distributed in the weld can hinder the movement of dislocations and the emergence and expansion of cracks, thus effectively inhibiting the generation of cracks in the weld and effectively improving the welding strength.

4. This application involves a striking rod, and when the weld is struck by the striking rod in a high-temperature state, and the tensile stress in the weld is converted into the favorable compressive stress, which can effectively mitigate the generation of thermal cracks at the weld. In the striking process, twin crystals and dislocations will be produced in high density in the weld structure, effectively improving the weld strength.

5. The clamping device can simultaneously fix the welding gun and the wire-feeding tube, and adjusting the angle and distance between the welding gun, the wire-feeding tube and the stringer, which facilitates the weld quality evaluation at different angles and distances.

The technical solutions of this application will be further described in detail below with reference to the accompanying drawings and embodiments.

Figure 1:
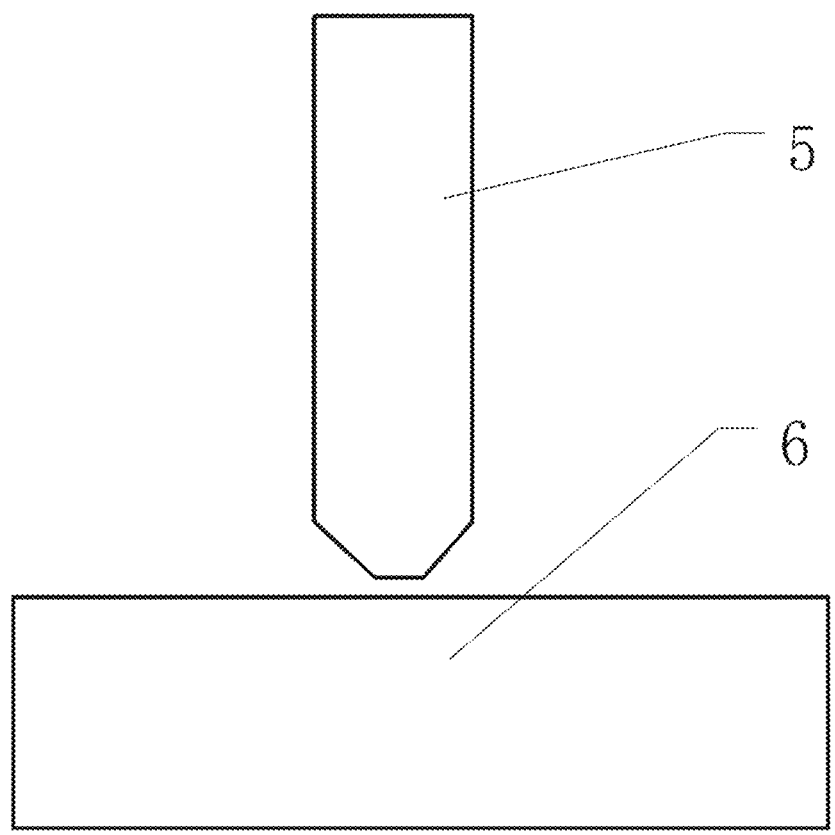
FIG. 1 schematically shows assembly of a stringer and a panel according to one embodiment of the present disclosure.

1, mounting frame; 11, connecting rod; 12, guide rail; 13, connecting plate; 14, locking pin; 15, first spring; 16, push hole; 17, pushing rod; 18, second spring; 19, pressing plate;

2, clamping mechanism; 21, first sliding plate; 22, sliding hole; 23, first mounting hole; 24, rotating shaft; 25, transmission plate; 26, connecting rod; 27, first motor; 28, first rotating seat;

3, striking mechanism; 31, third sliding plate; 32, second mounting plate; 33, cam; 34, striking rod; 35, second screw rod; 36, third motor; 37, third spring; 38, guide block; 39, second transmission belt; 310, second motor; 311, fixing plate; 312, end plate;

4, fixing mechanism; 41, first mounting plate; 42, sliding seat; 43, rotating plate; 44, first screw rod; 45, first transmission belt; 46, second sliding plate; 47, first gear; 48, rotary knob; 49, clamping plate; 410, second rotating seat; 411, first gear ring; 412, second gear; 413, second gear ring; 414, sliding rod; 415, second mounting hole; 416, supporting frame; and 5, stringer; and 6, panel.

DETAILED DESCRIPTION OF EMBODIMENTS

The technical solutions of the present disclosure will be further described below in conjunction with the accompanying drawings and embodiments.

As used herein, unless otherwise expressly specified and defined, the technical or scientific terms have the ordinary meaning understood by a person of ordinary skill in the art.

In addition, the terms "first" and "second" are merely used to distinguish different components, rather than indicating or implying order, number or relative importance. The terms "including" or "comprising" are intended to mean that the component or object preceding the term encompasses the components or objects and their equivalents enumerated after the term, and does not exclude other components or objects. The terms, such as "connect" or "link", are not limited to physical or mechanical connections, but may include electrical connections, direct connection, or indirect connection. As used herein, it should be noted that the terms "upper", "lower", "left", and "right", are used only to indicate relative positional relationships. When the position of the described object is changed, the relative position relationship may be changed accordingly.

A high-strength welding wire based on nanoparticle implantation and trace element compensation, in weight percentage, includes 5.5%-6.0% of Cu, 0.1%-0.5% of Mn, 0.05%-0.2% of V, 0.1%-0.5% of Zr, 0.1%-0.5% of Si, 0.1%-0.5% of Fe, 0.1%-0.5% of Zn, 1.0%-2.0% of a compensation element, 0.1%-0.5% of a hydrogen evolution element, 1.0%-2.0% of a nanoceramic particle, and Al for the balance.

The compensation element includes Mg and Li, with Mg accounting for 0.2% of the weight of the welding wire and Li accounting for 1.2% of the weight of the welding wire.

The hydrogen evolution element is Nb. The nanoceramic particles are nano-TiC particles or nano-TiB$_2$ particles or a combination thereof.

This disclosure further provides a method of preparing the high-strength welding wire based on nanoparticle implantation and trace element compensation, including the following steps (S1)-(S4).

(S1) Al powders, Cu powders, Li powders, Mn powders, V powders, Zr powders, Si powders, Fe powders, Mg powders, Nb powders, and Zn powders are weighed in accordance with a preset weight ratio, and ball milled in a ball mill under an inert atmosphere to obtain a first mixed powder.

The Al powders, Cu powders, Li powders, Mn powders, V powders, Zr powders, Si powders, Fe powders, Mg powders, Nb powders, and Zn powders are all high-purity metal powders with a purity greater than 99.9%.

The grinding balls in the ball mill are spherical zirconium oxide ($ZrO_2$). The ratio of the grinding balls to the first mixed powders is 6:1. The ball milling time is 3 h. The rotational speed is 300 rpm. The inert gas is argon. The particle size of the first mixed powder is 50-100 μm.

(S2) The nano-TiC particle and the nano-TiB$_2$ particle are weighed. The first mixed powder is mixed with the nano-TiC particle or nano-TiB$_2$ particle are mixed under a high-speed mixer to obtain the second mixed powder.

In this embodiment, a rotational speed of the high-speed mixer is 3000 r/min, and a mixing time is 30 min. The particle size of the nano-TiC particles and nano-TiB$_2$ particles is 80-100 nm.

(S3) An aluminum strip with a thickness of 0.5 mm is rolled into a U-shaped groove structure. The second mixed powder is filled in the U-shaped groove structure and rolled under a sealing condition by a roller press to obtain a tubular welding wire blank.

(S4) The tubular welding wire blank is subjected to wiredrawing by using a wire-drawing die to obtain a welding wire with a diameter of 1.2 mm.

A welding method of the high-strength welding wire based on nanoparticle implantation and trace element compensation, includes the following steps (1)-(6).

(1) A K-shaped groove is formed between the stringer 5 and the panel 6. The surfaces of the stringer 5 and the panel 6 are cleaned, and the stringer 5 and the panel 6 are fixed on a working platform.

(2) The clamping device is mounted on the manipulator. The welding gun is fixed on the clamping mechanism 2 of the clamping device. The inclined angle of the welding gun is adjusted so that an included angle between the welding gun and the stringer 5 is 20°-80° which is the angle at which the welding gun is deviated from the stringer 5. The distance between the bottom end of the welding gun and the weld are adjusted to be 40 mm-60 mm.

(3) The wire-feeding tube is fixed on the fixing mechanism 4. The angle between the wire-feeding tube and the welding gun is adjusted to 20°-50°. The laser-arc distance is adjusted to 2-5 mm, and a distance between a striking mechanism 3 and the weld is adjusted.

(4) A gas cylinder is opened to supply a protective gas to a welding pool at a flow rate of 10-20 L/min. The manipulator and a laser are started to weld the stringer 5 with the panel 6. A laser power is 2-3 KW, a welding speed is 0.5-2 m/min, a laser oscillating frequency is 50-100 Hz, a laser oscillating amplitude is 1-3 mm, and a feeding speed of the welding wire is 1~4 m/min.

(5) The striking mechanism 3 is started to strike the weld.

(6) After the welding operation is completed, the laser and the striking mechanism 3 are turned off, and the protective gas is continued to supply for 0.5 min-2 min, and the gas cylinder is closed.

Figure 2:
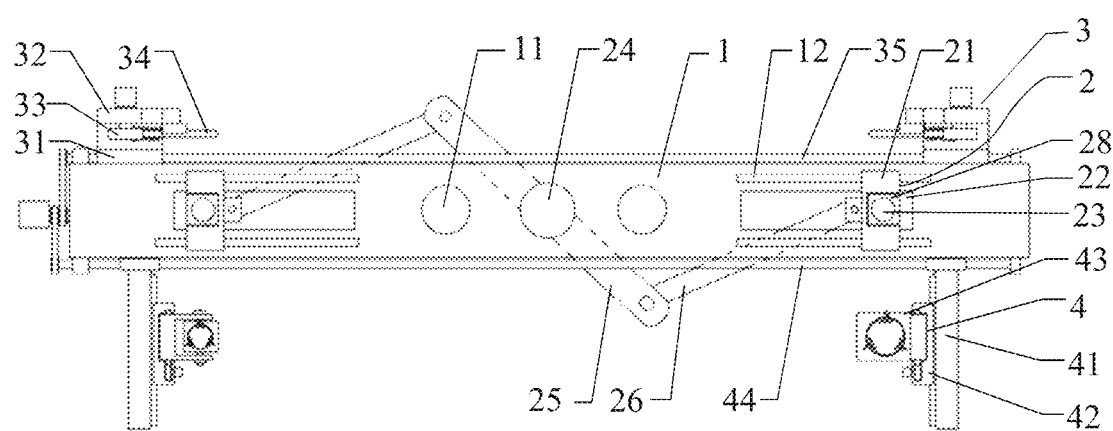
FIG. 2 is a schematic diagram of a clamping device according to one embodiment of the present disclosure.
Figure 3:
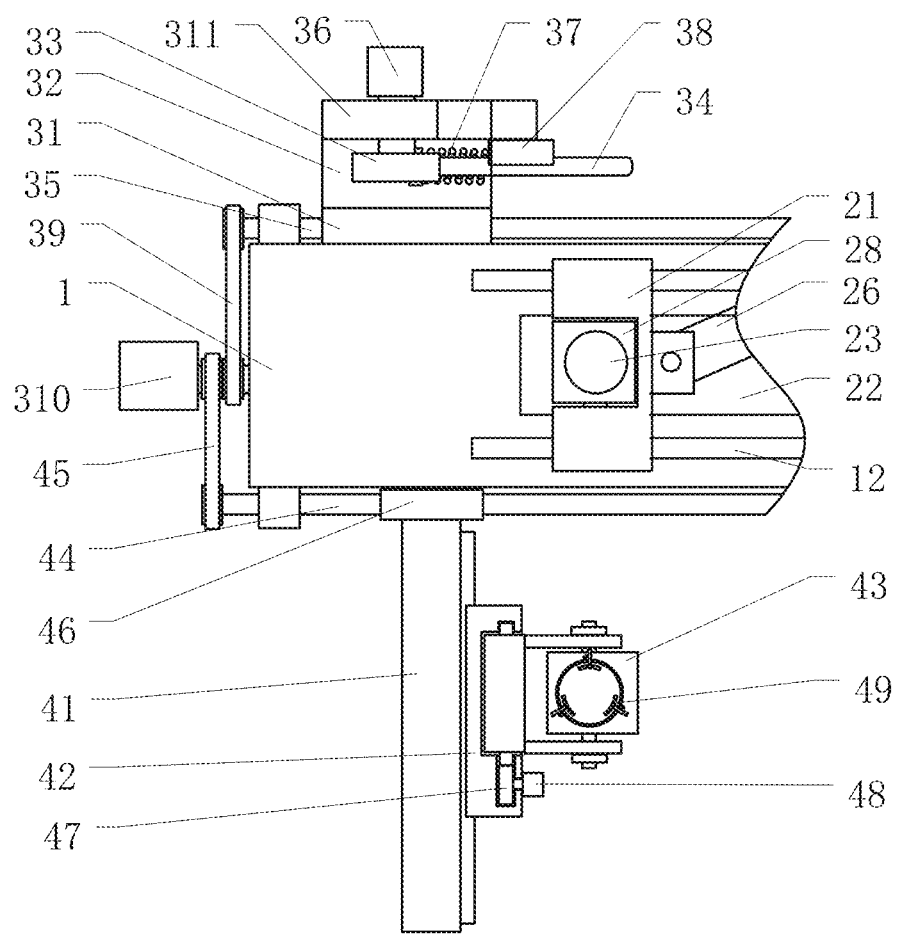
FIG. 3 schematically illustrates a partial structure of the clamping device according to one embodiment of the present disclosure.
Figure 7:
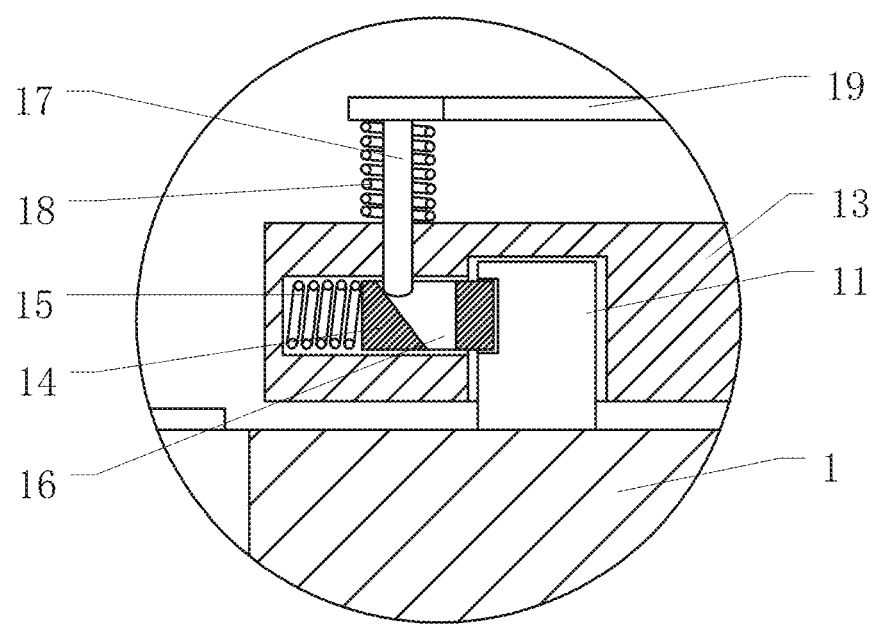
FIG. 7 is a schematic diagram of a locking structure according to one embodiment of the present disclosure.

As shown in FIGS. 2-3 and 7, the clamping device includes a mounting frame 1. The mounting frame 1 is a rigid horizontal plate. The mounting frame 1 is connected to a connecting plate 13 by a locking structure. The connecting plate 13 is fixed to a manipulator by screws or welding. The locking structure includes two connecting rods 11 fixedly disposed on the mounting frame 1. The connecting plate 13 is provided with an insertion hole for inserting the connecting rods 11. The connecting plate 13 is provided with a hole perpendicular to and communicating to the insertion hole. A locking pin 14 is slidably provided in the hole, and a locking hole is provided in the connecting rod 11 for the locking pin 14 for inserting therein. A first spring 15 is provided between the locking pin 14 and the hole, and two ends of the first spring 15 are fixed to the locking pin 14 and the wall of the hole. The locking pin 14 is inserted into the locking hole under the action of the first spring 15 to lock the mounting frame 1 with the connecting plate 13. The locking pin 14 is provided with a push hole 16, which runs through the locking pin 14 and is provided with a beveled surface on one side. The connecting plate 13 is provided with an opening for insertion of a pushing rod 17, which is connected and perpendicular to the hole. The pushing rod 17 is slidably connected to the opening. A ring-shaped pressing plate 19 is fixedly provided at the top of the pushing rod 17, and the two pushing rods 17 are fixed together by the pressing plate 19, facilitating simultaneous operation of the two pushing rods 17. A second spring 18 is provided between the pressing plate 19 and the connecting plate 13, and two ends of the second spring 18 are fixedly connected to the pressing plate 19 and the connecting plate 13, respectively. The bottom end of the pushing rods 17 is in contact with the beveled surface of the push holes 16 under the action of the second spring 18.

During installation, as the pressing plate 19 presses the pushing rod 17 downwardly, the second spring 18 is compressed, and the bottom end of the pushing rod 17 drives the locking pin 14 to slide in the hole through the beveled surface of the push hole 16. Then, the first spring 15 is compressed, the locking pin 14 slides into the hole, and the connecting rod 11 of the mounting frame 1 is inserted into the insertion hole. Then, the pressing plate 19 is released, the pressing plate 19 drives the pushing rod 17 upwardly under the action of the second spring 18, and the first spring 15 is reset. Then, the locking pin 14 is inserted into the locking hole of the connecting rod 11 under the action of the first spring 15 to realize the locking connection between the mounting frame 1 and the connecting plate 13.

Figure 6:
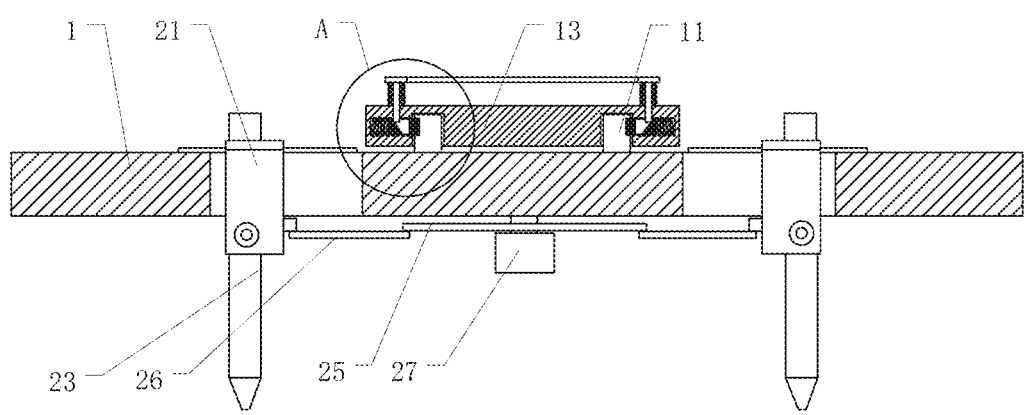
FIG. 6 is a schematic diagram of a clamping mechanism according to one embodiment of the present disclosure.

As shown in FIG. 6, two clamping mechanisms 2 are symmetrically provided at both ends of the mounting frame 1, and are configured to perform synchronized welding of the stringer 5 and the panel 6 from both sides of the stringer 5. The clamping mechanism 2 includes a first rotating seat 28. The first rotating seat 28 is provided with a first mounting hole 23 for mounting a welding gun. The welding gun is fixed in the first mounting hole 23 by screws. The first rotating seat 28 is rotatably provided on a first sliding plate 21. The first rotating seat 28 is fixedly provided with pins on both sides thereof, and the first sliding plate 21 is provided with through holes through which the pins pass. The pins are rotationally connected to the through holes. An external thread is provided on the outer surface of the pin, and the pin is locked with the first sliding plate 21 by a lock nut. Loosening the locking nut allows the angle of the welding gun to be adjusted as required. A scale may be provided on the first sliding plate 21, thereby facilitating observation of the tilt angle of the welding gun.

The mounting frame 1 is provided with a sliding structure that drives the first sliding plate 21 to slide on the mounting frame 1. The sliding structure includes a rotating shaft 24, and the rotating shaft 24 is rotationally connected to the mounting frame 1 via a bearing. The mounting frame 1 is fixedly provided with a first motor 27 that drives the rotation of the rotating shaft 24. A transmission plate 25 is fixedly provided on the rotating shaft 24, and both ends of the transmission plate 25 are each hingedly connected to the first sliding plates 21 by the connecting rod 26. The two ends of the connecting rod 26 are hingedly connected to the transmission plate 25 and the first sliding plate 21 by rotating pins. The mounting frame 1 is fixedly provided with a guide rail 12 to guide sliding of the first sliding plate 21. The first sliding plate 21 is provided with a guide groove, and the guide rail 12 is disposed in the guide groove and slidably connected with the guide groove. The mounting frame 1 is provided with a sliding hole 22 to prevent interference with the welding gun to meet the movement and rotation of the welding gun.

When in use, the first motor 27 drives the rotating shaft 24 to rotate, the rotating shaft 24 drives the transmission plate 25 to rotate synchronously. The transmission plate 25 drives, by the connecting rod 26, the two first sliding plates 21 to slide relative to each other or backward from each other synchronously under the action of the guide rail 12, so as to adjust the distance between the welding gun and the stringer 5, thereby welding the stringers 5 with different spacing and different widths.

Figure 4:
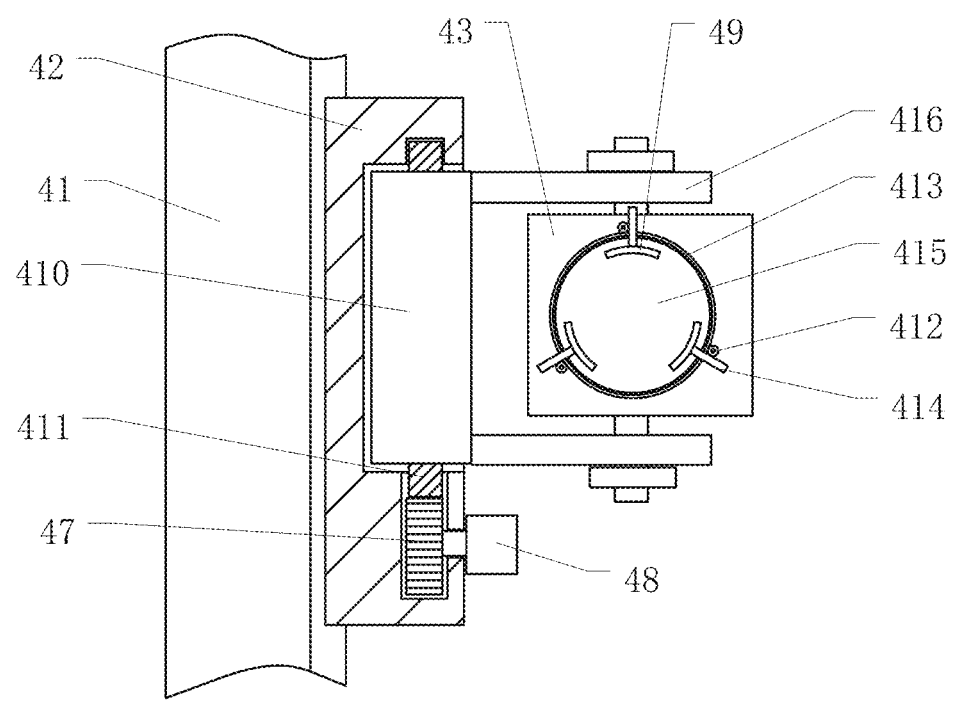
FIG. 4 is a schematic diagram of a fixing mechanism according to one embodiment of the present disclosure.

As shown in FIG. 4, two fixing mechanisms 4 are symmetrically disposed on a first side of the mounting frame 1, and are configured to fix the wire-feeding tube, so that the welding wire can be stably transported to the position to be welded. Two fixing mechanisms 4 respectively provide the welding wires for the to be welded welding parts on both sides of the stringer 5. The fixing mechanism 4 includes a first mounting plate 41. The first mounting plate 41 is fixedly provided on a second sliding plate 46. The second sliding plate 46 is provided with threaded holes for the first screw rod 44 to pass through and fit the first screw rod 44. The first screw rod 44 is a bidirectional screw rod. Two second sliding plates 46 are respectively located at the two ends of the bidirectional screw rod. The two second sliding plates 46 are driven by the bidirectional screw rod to synchronously slide relative to each other or backwardly from each other, so as to facilitate the synchronous adjustment of the two wire-feeding tubes. The mounting frame 1 is provided with a sliding groove which has a guiding and supporting effect on the sliding of the second sliding plate 46. The second sliding plate 46 is provided with a bump, which is located in the sliding groove and slidably connected with the sliding groove. The first screw rod 44 is rotationally connected to the mounting frame 1 via a bearing seat. The mounting frame 1 is fixedly provided with a second motor 310 that drives the first screw rod 44 to rotate. A drive wheel is fixedly provided on the output shaft of the second motor 310, and the drive wheel is connected to a driven wheel fixedly provided on the first screw rod 44 via a first transmission belt 45.

The first mounting plate 41 is provided with a sliding seat 42. The sliding seat 42 is slidably connected to the first mounting plate 41. The first mounting plate 41 is provided with a slide groove having a guiding and supporting effect on the sliding of the sliding seat 42. The sliding seat 42 is provided with a jack screw to lock the sliding seat 42 with the first mounting plate 41. Loosening the jack screw adjusts the position of the sliding seat 42 on the first mounting plate 41 so as to adjust the distance between the wire-feeding tube and the welding gun. the jack screw is tightened to achieve the locking between the sliding seat 42 and the first mounting plate 41.

The sliding seat 42 is provided with a recess. A second rotating seat 410 is disposed in the recess. The second rotating seat 410 is rotationally connected to the recess by a bearing. A first gear ring 411 is fixedly provided on the second rotating seat 410. A first gear 47 is rotationally provided on the sliding seat 42 through the bearing to engage with the first gear ring 411. The first gear 47 is disposed in the recess. A rotary knob 48 is fixedly provided on the gear shaft of the first gear 47. The first gear 47 is rotated through the rotary knob 48. The first gear 47 drives the second rotating seat 410 to rotate through the first gear ring 411. The second rotating seat 410 drives the rotating plate 43 to rotate through supporting frame 416, so as to adjust the angle of the wire-feeding tube between the welding guns.

Both sides of the second rotating seat 410 are each fixedly provided with the supporting frame 416. A rotating plate 43 is rotated between the supporting frames 416. A rotating shaft is provided on both sides of the rotating plate 43. A through hole is provided on the supporting frame 416 for the rotating shaft to pass through. The rotating shaft is rotationally connected to the through hole. The rotating shaft is provided with an external thread, and the rotating shaft is locked with the supporting frame 416 by a lock nut, thereby realizing the locking and positioning of the rotating plate 43. The rotating plate 43 is provided with a second mounting hole 415 for fixing the wire-feeding tube. The rotating plate 43 can be rotated by loosening the lock nut, so that the inclined angle of the wire-feeding tube can be adjusted by the rotating plate 43 to meet the needs of different inclined angles for wire feeding. A scale can be provided on the supporting frame 416 to facilitate observation of the tilt angle of the wire-feeding tube.

The second mounting hole 415 is provided with a clamping plate 49 for clamping the wire-feeding tube. The clamping plate 49 is a curved plate. The clamping plate 49 is provided with a rubber protective pad on the side near the wire-feeding tube. The protective pad protects the wire-feeding tube. A sliding rod 414 is fixedly provided in the middle of the clamping plate 49. The sliding rod 414 is slidably connected with the rotating plate 43. The rotating plate 43 is provided with a limit slot along the axis of the second mounting hole 415. The sliding rod 414 is located in the limit slot and slidably connected with the limit slot. The limit slot has a limiting effect on the sliding of the sliding rod 414, so that the sliding rod 414 slides linearly along the axis of the second mounting hole 415. The rotating plate 43 is rotationally provided with a second gear 412 corresponding to the sliding rod 414. The rotating plate 43 is rotationally provided with a second gear ring 413 coaxial with the second mounting hole 415 through a bearing. The second gear 412 is engaged with both the second gear ring 413 and the gear rack on the sliding rod 414.

By rotating the gear shaft of one second gear 412, the second gear 412 drives the second gear ring 413 to rotate. Then, the second gear ring 413 drives the remaining two second gears 412 to rotate synchronously. Then, the second gear 412 drives the sliding rod 414 to slide on the rotating plate 43 through the gear rack, thereby clamping or loosening the wire-feeding tube, and realizing the rapid fixing or dismantling of the wire-feeding tube.

Figure 5:
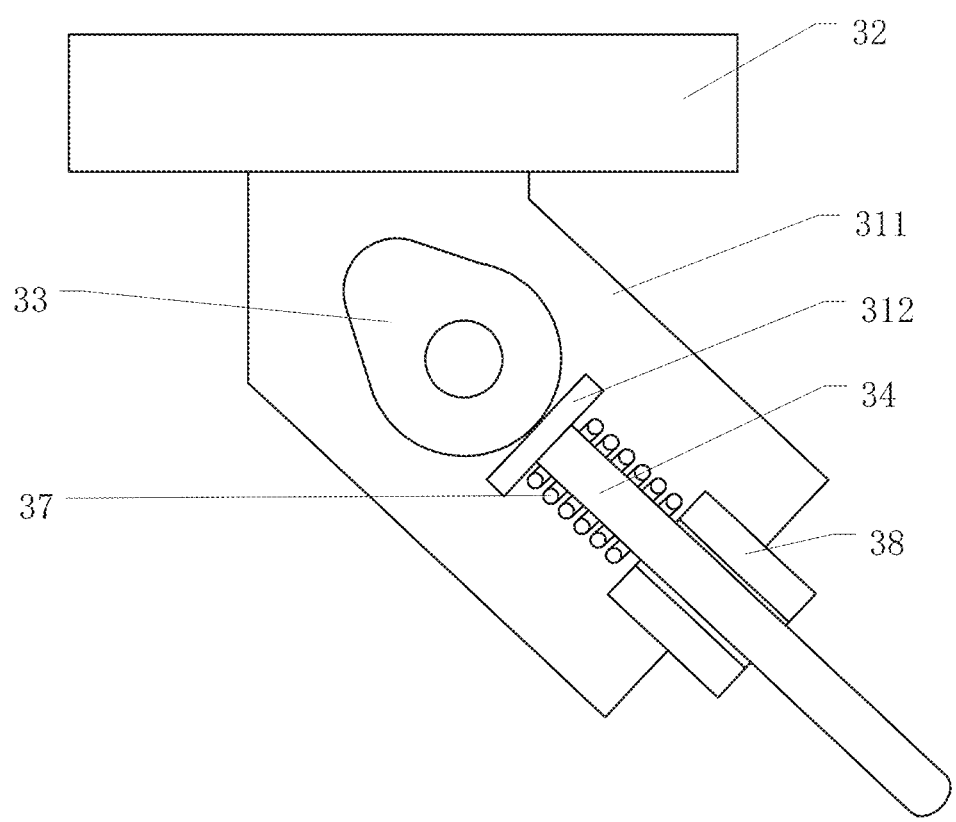
FIG. 5 is a schematic diagram of a striking mechanism according to one embodiment of the present disclosure.

As shown in FIG. 5, two striking mechanisms 3 are symmetrically provided on a second side of the mounting frame 1, and are configured to separately strike the weld after welding, thereby releasing the stress within the weld and mitigating the generation of cracks. The striking mechanism 3 includes a third sliding plate 31. The third sliding plate 31 is slidably connected to the mounting frame 1. The mounting frame 1 is provided with a sliding groove having a guiding and supporting effect on the sliding of the third sliding plate 31. The third sliding plate 31 is provided with a bump, which is disposed in the sliding groove and slidably connected with the sliding groove. The third sliding plate 31 is provided with a threaded hole through which the second screw rod 35 passes and fits the second screw rod 35. The second screw rod 35 is rotationally connected to the mounting frame 1 through a bearing seat. The second screw rod 35 is a bi-directional screw. The third sliding plate 31 is located at both ends of the second screw rod 35. The second screw rod 35 drives the two third sliding plates 31 to slide relative to each other, so as to adjust the distance between the striking mechanism 3 and the stringer 5, thereby satisfying the need for striking the stringers 5 of different widths.

A driven wheel is fixedly provided on the end of the second screw rod 35. The driven wheel on the end of the second screw rod 35 is connected with the drive wheel fixedly provided on the output shaft of the second motor 310 through a second transmission belt 39. Two drive wheels are provided on the output shaft of the second motor 310. The two drive wheels on the output shaft of the second motor 310 are respectively connected to the driven wheels on the second screw rod 35 and the first screw rod 44. A second mounting plate 32 is fixedly provided on the third sliding plate 31. A fixing plate 311 is fixedly provided on the end of the second mounting plate 32. A cam 33 is rotationally provided on the fixing plate 311 through a bearing. A third motor 36 is fixedly provided on the fixing plate 311 to drive the cam 33 to rotate. A striking rod 34 is provided on one side of the fixing plate 311. The bottom end of the striking rod 34 has a rounded head structure, which is convenient for striking the weld. The bottom of the fixing plate 311 is fixedly provided with the third motor 36 to rotate the cam 33. The bottom of the fixing plate 311 is fixedly provided with a guide block 38. The guide block 38 is provided with a tilted groove. The striking rod 34 is located in the tilted groove and slidably connected with the tilted groove. The striking rod 34 slides along the tilted groove. An end plate 312 is fixedly provided at the top of the striking rod 34. A third spring 37 is provided between the end plate 312 and the guide block 38. Two ends of the third spring 37 are fixedly connected to the end plate 312 and the guide block 38, respectively. The end plate 312 is always in contact with the side wall of the cam 33 under the action of the third spring 37. The third motor 36 drives the cam 33 to rotate. The cam 33 drives the striking rod 34 to slide along the guide block 38 through the end plate 312, and the striking rod 34 slides back and forth under the action of the third spring 37, so as to strike the weld.

Embodiment

The stringer 5 and the to-be-welded panel 6 in this embodiment were made of 2195 aluminum-lithium alloy. The thickness of the stringer 5 was 4 mm, and the thickness of the panel 6 was 4 mm. The assembly of the stringer 5 and the panel 6 was shown in FIG. 1.

The high-strength welding wire based on nanoparticle implantation and trace element compensation had the following composition: in weight percentage, 5.8% of Cu, 1.2% of Li, 0.2% of Mn, 0.1% of V, 0.2% of Zr, 0.2% of Si, 0.3% of Fe, 0.2% of Mg, 0.2% of Nb, 0.1% of Zn, 1.2% of TiC, and Al for the balance.

The particle size of the ball-milled mixed powder was 80 μm, and the particle size of the nano-TiC powder was 100 nm.

The included angle between the welding gun and the stringer 5 was 45°, and the distance between the bottom end of the welding gun and the weld was 50 mm.

The angle between the wire-feeding tube and the welding gun was 45°. The angle between the wire-feeding tube and the stringer 5 was 45°. The laser-arc distance was 3 mm.

The protective gas was argon. The flow rate of argon was 15 L/min. The laser power was 2 kW, the welding speed was 1 m/min, the laser oscillating frequency was 60 Hz, the laser oscillating amplitude was 2 mm, and the wire feeding speed was 2 m/min.

Figure 8:
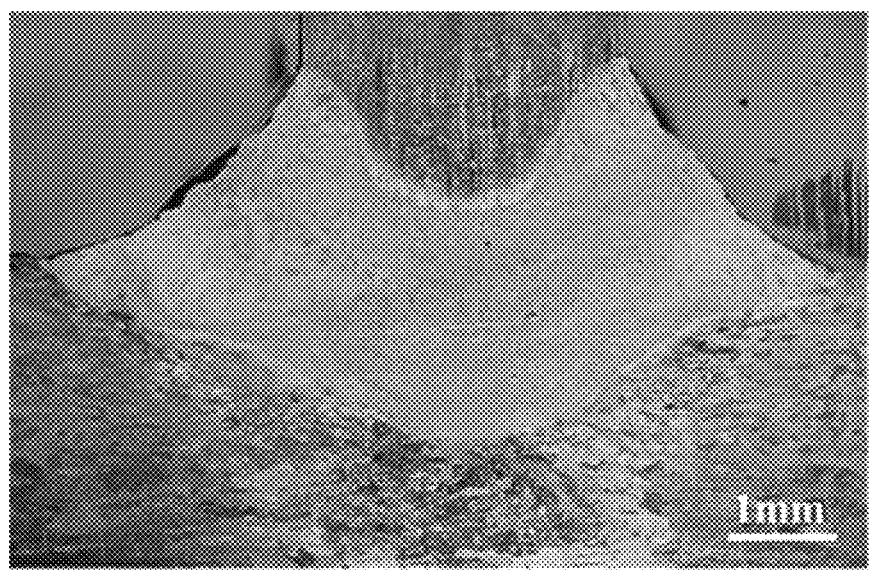
FIG. 8 illustrates a macrostructure of a weld according to one embodiment of the present disclosure.
Figure 9:
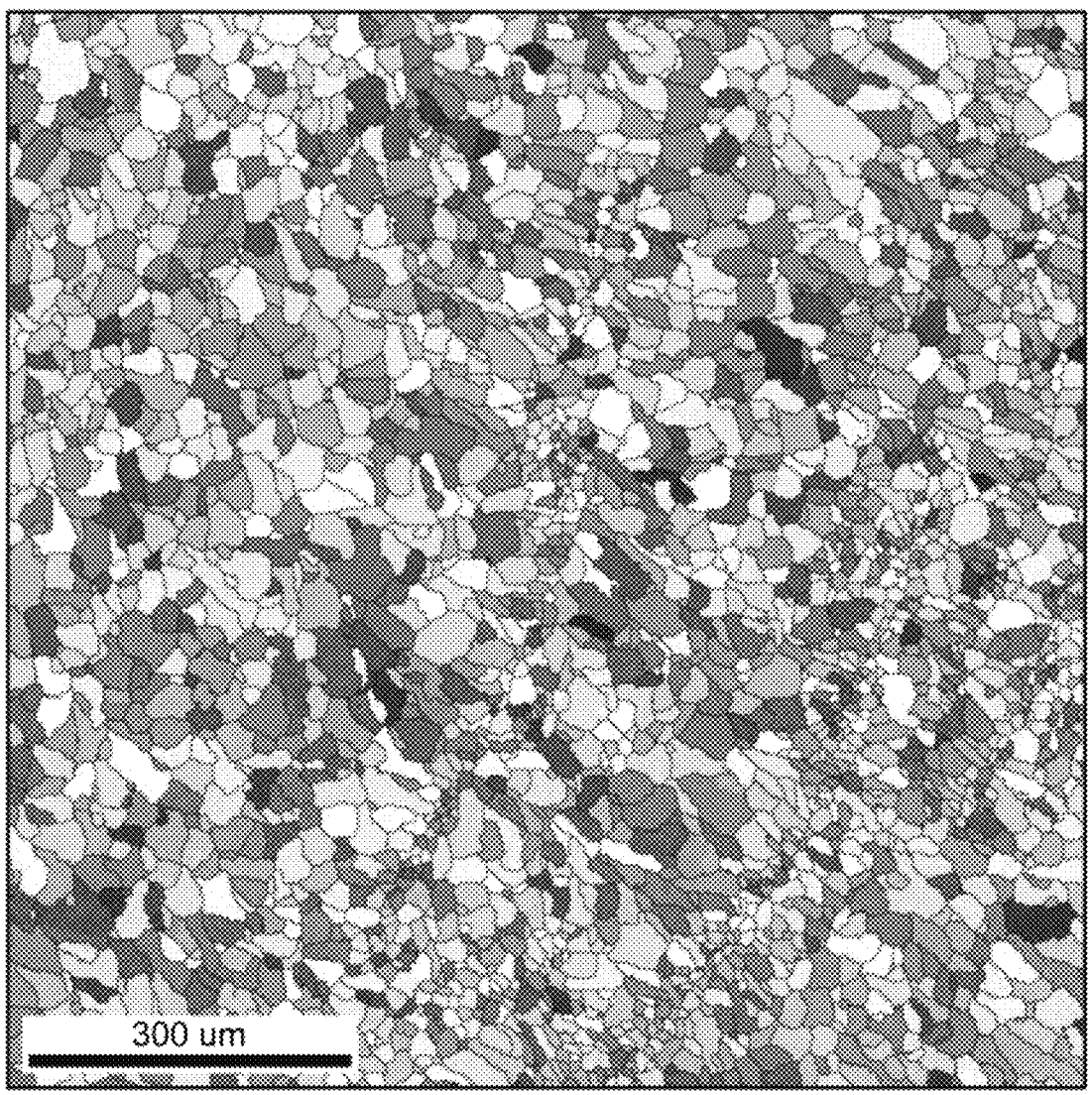
FIG. 9 illustrates a microstructure of the weld according to one embodiment of the present disclosure.

As observed from FIGS. 8 and 9, the resultant weld consisted of equiaxed fine crystals and equiaxed dendritic crystals, and was free of columnar crystals, and there were no porosity and cracks in the weld. These results showed that the weld in the present disclosure had a very fine grain size, and the disclosure can effectively refine the weld grain and mitigate the generation of porosity and cracks in the weld. These results were because the nano-TiC powders with the high melting point could be used as nucleation sites during the cooling process of the welding pool, so that it could crystallize in many places in the welding pool at the same time, and the grains could not continue to grow due to limit of the neighboring grains during the growing process of the grains, thereby obtain a fine grain organization. In addition, the nano-TiC powders as hard particles distributed in the weld can hinder the movement of dislocations and the emergence and expansion of cracks, thus effectively inhibiting the generation of cracks in the weld and effectively improving the welding strength.

Nb element was added as a hydrogen evolution element in the welding wire. Nb element had the function of gas absorption and hydrogen fixation, and Nb could increase the temperature of the welding pool, increase the fluidity of the welding pool, so that the gas involved in the welding pool could be fully discharged, and effectively inhibit the generation of porosity in the weld. Increase of Mg and Li elements in the welding wire could compensate for burnout of the low-boiling-point Mg and Li element in the welding process, improve the wettability between the welding wire and the welding base material, the weld structure, and the strength of the weld.

In the welding process, a striking rod 34 was used to strike the weld in a high-temperature state, and the striking rod 34 could release thermal stress in the weld in the striking process, and convert the tensile stress into a compressive stress favorable to the weld, thereby effectively mitigating the generation of thermal cracks at the weld. In the striking process, twin crystals and dislocations will be produced in high density in the weld structure, effectively improving the weld strength.

Tensile test results of the welded joint obtained in this embodiment showed that the tensile strength of the welded joint was 308 MPa, and the elongation after break was 5.7%.

Therefore, the high-strength welding wire based on nanoparticle implantation and trace element compensation and the preparation method and welding method thereof provided in the present disclosure can solve the problems of poor quality and low strength of welds in the welding of the existing aluminum-lithium alloys.

Described above are merely preferred embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A welding method for a welding wire based on nanoparticle implantation and trace element compensation, wherein in weight percentage, the welding wire comprises 5.8% of Cu, 0.2% of Mn, 0.1% of V, 0.2% of Zr, 0.2% of Si, 0.3% of Fe, 0.1% of Zn, 1.4% of a compensation element, 0.2% of a hydrogen evolution element, 1.2% of a nanoceramic particle, and Al for balance;

the compensation element comprises Mg and Li, wherein Mg accounts for 0.2% of a weight of the welding wire, and Li accounts for 1.2% of the weight of the welding wire; the hydrogen evolution element is Nb; and the nanoceramic particle is nano-TiC particle or nano-TiB$_2$ particle;

the welding wire is prepared through steps of:
(a) weighing Al powders, Cu powders, Li powders, Mn powders, V powders, Zr powders, Si powders, Fe powders, Mg powders, Nb powders, and Zn powders in accordance with a preset weight ratio, following by ball milling in a ball mill under an inert atmosphere to obtain a first mixed powder;
(b) weighing the nano-TiC particle or the nano-TiB$_2$ particle; and mixing the first mixed powder with the nano-TiC particle or nano-TiB$_2$ particle in a mixer to obtain a second mixed powder;
(c) rolling an aluminum strip with a thickness of 0.5 mm into a U-shaped groove structure; filling the second mixed powder in the U-shaped groove structure followed by rolling under a sealing condition by a roller press to obtain a tubular welding wire blank; and
(d) subjecting the tubular welding wire blank to wire-drawing by using a wire-drawing die to obtain the welding wire with a diameter of 1.2 mm;

the welding method comprises:
(A) forming a K-shaped groove between a stringer and a panel; cleaning surfaces of the stringer and the panel;

and fixing the stringer and the panel on a working platform, wherein the stringer and the panel are both made of an aluminum-lithium alloy;
(B) installing a clamping device on a manipulator; fixing a welding gun on a clamping mechanism of the clamping device; and adjusting an inclined angle of the welding gun such that an included angle between the welding gun and the stringer is 20°-80°, and adjusting a distance between a bottom end of the welding gun and a weld to be 40 mm-60 mm;
(C) fixing a wire-feeding tube on a fixing mechanism; adjusting an angle between the wire-feeding tube and the welding gun to 20°-50°; adjusting a laser-arc distance to 2-5 mm; and adjusting a distance between a striking mechanism and the weld;
(D) opening a gas cylinder to supply a protective gas to a welding pool at a flow rate of 10-20 L/min; and starting the manipulator and a laser to weld the stringer with the panel, wherein a laser power is 2-3 kW, a welding speed is 0.5-2 m/min, a laser oscillating frequency is 50-100 Hz, a laser oscillating amplitude is 1-3 mm, and a feeding speed of the welding wire is 1-4 m/min;
(E) starting the striking mechanism to strike the weld; and
(F) after completing a welding operation, turning off the laser and the striking mechanism; and continuing to supply the protective gas for 0.5-2 min, and closing the gas cylinder;
wherein the clamping device comprises a mounting frame; a middle part of the mounting frame is fixed on the manipulator; a number of the clamping mechanism is two, and the two clamping mechanisms are symmetrically provided at two ends of the mounting frame; a number of the fixing mechanism is two, and the two fixing mechanisms are symmetrically provided on a first side of the mounting frame; a number of the striking mechanism is two, and the two striking mechanisms are symmetrically provided on a second side of the mounting frame; each of the two clamping mechanisms comprises a first rotating seat; the first rotating seat is provided with a first mounting hole for mounting the welding gun; the first rotating seat is rotationally provided on a first sliding plate; the first rotating seat is configured to be locked with the first sliding plate through a locking member; the mounting frame is provided with a sliding structure configured to drive the first sliding plate to slide on the mounting frame; the sliding structure comprises a rotating shaft rotationally connected to the mounting frame; the mounting frame is provided with a first motor configured to drive the rotating shaft to rotate; the rotating shaft is provided with a transmission plate; two ends of the transmission plate are each hinged to the first sliding plate through a connecting rod; and the mounting frame is provided with a guide rail to guide sliding of the first sliding plate, and a sliding hole to prevent interference with the welding gun;
each of the two fixing mechanisms comprises a first mounting plate; the first mounting plate is provided on a second sliding plate; the second sliding plate is provided with a first threaded hole, and the first threaded hole is configured to allow a first screw rod to pass through, and fit the first screw rod; the first screw rod is rotationally connected to the mounting frame; the mounting frame is provided with a second motor configured to drive the first screw rod to rotate; a drive wheel on an output shaft of the second motor is connected to a first driven wheel on the first screw rod through a first transmission belt; the first mounting plate is provided with a sliding seat; the sliding seat is slidably connected with the first mounting plate; the sliding seat is provided with a jack screw to lock the sliding seat and the first mounting plate; the sliding seat is rotationally provided with a second rotating seat; the second rotating seat is provided with a first gear ring; the sliding seat is rotationally provided with a first gear engaged with the first gear ring; a gear shaft of the first gear is provided with a rotary knob; supporting frames are respectively provided on both sides of the second rotating seat; a rotating plate is rotationally provided between the supporting frames; each of the supporting frames is connected to the rotating plate through a lock nut; the rotating plate is provided with a second mounting hole for fixing the wire-feeding tube; a clamping plate is provided at the second mounting hole for clamping the wire-feeding tube; a middle part of the clamping plate is provided with a sliding rod; the sliding rod is slidably connected to the rotating plate; the rotating plate is rotationally provided with a second gear corresponding to the sliding rod; the rotating plate is rotationally provided with a second gear ring coaxial with the second mounting hole; and the second gear is engaged with the second gear ring and a gear rack on the sliding rod; and each of the two striking mechanisms comprises a third sliding plate; the third sliding plate is slidably connected with the mounting frame; the third sliding plate is provided with a second threaded hole, and the second threaded hole is configured to allow a second screw rod to pass through, and fit the second screw rod; the second screw rod is rotationally connected with the mounting frame; a second driven wheel is provided at an end of the second screw rod, and is in drive connection with the drive wheel on the output shaft of the second motor through a second transmission belt; the third sliding plate is provided with a second mounting plate; a fixing plate is provided on an end of the second mounting plate; a cam is rotationally provided on the fixing plate; a third motor is provided on the fixing plate to drive the cam to rotate; a striking rod is provided on one side of the fixing plate; a guide block is provided at a bottom of the fixing plate; a tilted groove is provided on the guide block; the striking rod is located in the tilted groove, and slidably connected to the tilted groove; an end plate is provided at a top end of the striking rod; and a spring is provided between the end plate and the guide block to keep the end plate being in contact with a side wall of the cam.

2. The welding method of claim 1, wherein in the step (a), a particle size of the first mixed powder is 50-100 μm.

3. The welding method of claim 1, wherein in the step (b), a particle size of the nano-TiC particle is 80-100 nm, and a particle size of the nano-TiB$_2$ particle is 80-100 nm.

* * * * *